US009916849B1

United States Patent
Mader et al.

(10) Patent No.: US 9,916,849 B1
(45) Date of Patent: Mar. 13, 2018

(54) METHOD AND APPARATUS FOR DETECTING AND REMEDIATING IN RESPONSE TO INSUFFICIENT OR EXCESSIVE HAMR OPTICAL POWER

(71) Applicant: Seagate Technology LLC, Cupertino, CA (US)

(72) Inventors: Drew Michael Mader, Minneapolis, MN (US); Tim Rausch, Farmington, MN (US); James E. Angelo, Savage, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/347,129

(22) Filed: Nov. 9, 2016

(51) Int. Cl.
| G11B 11/00 | (2006.01) |
| G11B 7/1263 | (2012.01) |
| G11B 7/126 | (2012.01) |
| G11B 5/00 | (2006.01) |
| G11B 5/60 | (2006.01) |
| G11B 11/105 | (2006.01) |
| G11B 7/1267 | (2012.01) |

(52) U.S. Cl.
CPC ............ *G11B 7/1263* (2013.01); *G11B 7/126* (2013.01); *G11B 5/6088* (2013.01); *G11B 7/1267* (2013.01); *G11B 11/1051* (2013.01); *G11B 11/10506* (2013.01); *G11B 2005/0021* (2013.01)

(58) Field of Classification Search
None
See application file for complete search history.

(56) References Cited

U.S. PATENT DOCUMENTS

| 5,182,682 | A | * | 1/1993 | Weispfenning .... G11B 5/59688 360/135 |
| 5,625,506 | A | | 4/1997 | Dovek et al. |
| 7,969,826 | B2 | | 6/2011 | Naniwa et al. |
| 8,570,842 | B1 | | 10/2013 | Richter et al. |
| 8,913,341 | B1 | | 12/2014 | Jury et al. |
| 8,937,783 | B2 | | 1/2015 | Albrecht et al. |
| 9,153,272 | B1 | | 10/2015 | Rausch et al. |
| 9,311,951 | B1 | * | 4/2016 | Chu .......................... G11B 5/02 |
| 9,525,576 | B1 | | 12/2016 | Patapoutian et al. |
| 9,595,288 | B1 | | 3/2017 | Chu et al. |
| 9,613,652 | B2 | | 4/2017 | Link et al. |
| 2010/0027149 | A1 | | 2/2010 | Boonyurn |
| 2011/0035634 | A1 | | 2/2011 | Blaum et al. |
| 2013/0163111 | A1 | * | 6/2013 | Albrecht ................ G11B 5/012 360/75 |
| 2014/0192435 | A1 | | 7/2014 | Buch |
| 2015/0279430 | A1 | * | 10/2015 | Trantham ................ G11B 5/314 369/13.26 |
| 2015/0332725 | A1 | | 11/2015 | Rausch et al. |

(Continued)

OTHER PUBLICATIONS

May 31, 2017, File History for U.S. Appl. No. 15/246,835.
U.S. Appl. No. 15/246,835, filed Aug. 25, 2016, Mader et al.

*Primary Examiner* — Tan X Dinh
(74) *Attorney, Agent, or Firm* — Hollingsworth Davis, LLC

(57) ABSTRACT

An optical power level applied via a laser when recording data to a track of a heat-assisted recording medium is determined. In response to the optical power level being too low or too high, remedial action is taken to prevent loss of data on one or more of the track and an adjacent track.

19 Claims, 5 Drawing Sheets

(56) References Cited

U.S. PATENT DOCUMENTS

| | | | |
|---|---|---|---|
| 2016/0104514 A1* | 4/2016 | Burnett | G11B 5/6088 369/13.02 |
| 2016/0307590 A1* | 10/2016 | Yang | G11B 7/1267 |
| 2017/0092318 A1* | 3/2017 | Chu | G11B 7/1267 |
| 2017/0162222 A1* | 6/2017 | Matousek | G11B 11/10534 |

* cited by examiner

METHOD AND APPARATUS FOR DETECTING AND REMEDIATING IN RESPONSE TO INSUFFICIENT OR EXCESSIVE HAMR OPTICAL POWER

SUMMARY

The present disclosure is directed to detecting and remediating for insufficient or excessive heat-assisted magnetic recording laser power. In one embodiment, an optical power level applied via a laser when recording data to a track of a heat-assisted recording medium is determined. In response to the optical power level being too low or too high, remedial action is taken to prevent loss of data on one or more of the track and an adjacent track.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to data storage devices that utilize magnetic storage media, e.g., magnetic disks. Data storage devices described herein use a particular type of magnetic data storage known heat-assisted magnetic recording (HAMR), also referred to as energy-assisted magnetic recording (EAMR), thermally-assisted magnetic recording (TAMR), and thermally-assisted recording (TAR). This technology uses an energy source such as a laser to create a small hotspot on a magnetic disk during recording. The energy from the laser is coupled into an optical waveguide path and directed to a near-field transducer that shapes and directs the energy to heat the recoding medium. The heat lowers magnetic coercivity at the hotspot, allowing a write transducer to change magnetic orientation, after which the hotspot is allowed to rapidly cool. Due to the relatively high coercivity of the medium after cooling, the data is less susceptible to data errors due to thermally-induced, random fluctuation of magnetic orientation known as the superparamagnetic effect.

Because the magnetic field applied during recording is typically much larger than the hotspot, the size of the hotspot defines the size of the recorded bits of data. If there are changes to the hotspot size, then performance may suffer. For example, if the hotspot is too large, then adjacent track data may be overwritten. If the hotspot is too small, the resulting narrow track may be difficult to read back.

While a number of causes can affect the hotspot size (e.g., changes in the laser, changes in the delivery path), the system controller may have only a few active components that can be adjusted to maintain hotspot size. One of these active components is the laser diode itself, the output of which can be changed by changing a current applied to the laser. The output of the laser can be occasionally recalibrated to account for environmental conditions and aging, e.g., by performing tests to determine a minimum level of current that causes the laser to begin emitting light. However, while recording data, the output of the laser itself is generally not actively adjusted.

Even a small change in the laser's power while recording can have significant effects on the HAMR recording process. This may cause bit error rate (BER) degradation on a written track as well as adjacent tracks on either side. In addition to changes due to environment or aging, the laser in a HAMR drive can undergo what is sometimes called a mode hop. A mode hop results in a sudden change in optical power. When the laser power increases there is potential for BER degradation on the adjacent tracks (and possibly the next sectors on the track currently being written). When the laser power decreases there is potential for BER loss on the currently written track.

Figure 1:
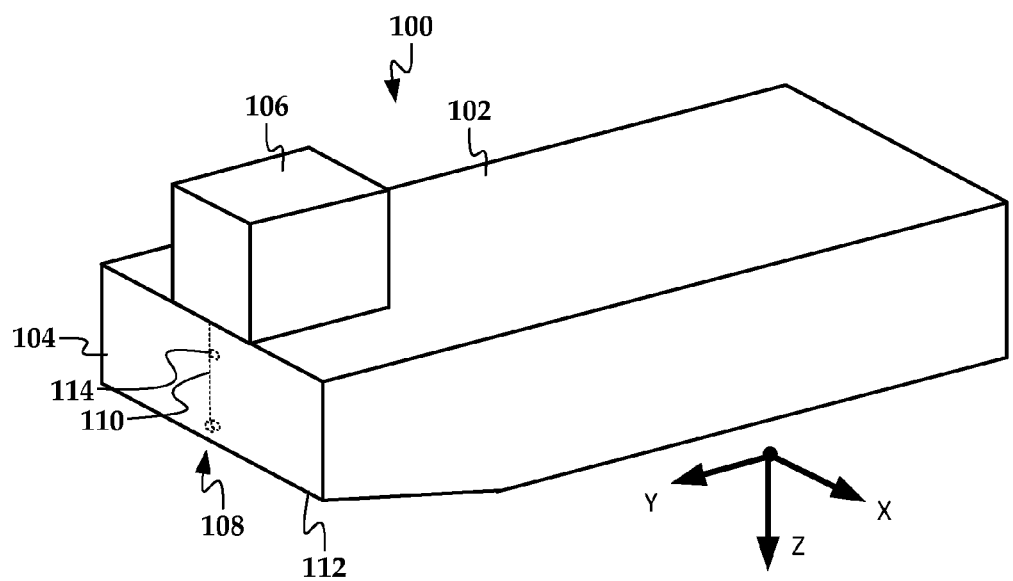
FIG. 1 is a perspective view of a slider assembly according to an example embodiment.

In embodiments described below, a HAMR data storage device employs a power monitor to monitor the power from the laser. The power monitor can be implemented using any number of devices (e.g., a photodetector, a bolometer, thermistor, etc.) and can be used in many ways to monitor the changes in the power of the laser during many processes. Embodiments describe below are configured to analyze the output of the power monitor to infer BER degradation on the track being written and/or its neighboring tracks and subsequently make reliability decision on those tracks in background activities during drive operation In reference now to FIG. 1, a perspective view shows a read/write head 100 according to an example embodiment. The read/write head 100 may be used in a magnetic data storage device, e.g., HAMR hard disk drive. The read/write head 102 may also be referred to herein interchangeably as a slider, write head, read head, recording head, etc. The read/write head 100 has a slider body 102 with read/write transducers at a trailing edge 104 that are held proximate to a surface of a magnetic recording medium (not shown), e.g., a magnetic disk.

The illustrated read/write head 100 is configured as a HAMR device, and so includes additional components that form a hot spot on the recording medium near the read/write transducer 108. These components include an energy source 106 (e.g., laser diode) and a waveguide 110. The waveguide 110 delivers electromagnetic energy from the energy source 106 to a near-field transducer that is part of the read/write transducers 108. The near-field transducer achieves surface plasmon resonance in response to the coupled light and directs the energy out of a media-facing surface 112 to create a small hot spot on the recording medium.

A power monitor 114 is located in the read/write head, e.g., at or near a light path to detect emissions from the laser diode 106. The power monitor 114 may be configured as a bolometer, which is generally a wire or other absorptive element that has a known change in resistance due to changes in temperature, e.g., temperature coefficient of resistance (TCR). The bolometer material may be selected to have high optical absorption at the wavelength of the laser. The power monitor 114 may measure other known phenomenon that changes in response to temperature and/or optical power, such as resistance (bolometer, photodiode), voltage (thermocouple, photovoltaic cell), thermal expansion (strain gauge), etc. The power monitor 114 may be selected to have high sensitivity to the wavelengths emitted from the laser diode 106, and can be coupled to sensing circuitry as known in the art.

Figure 2:
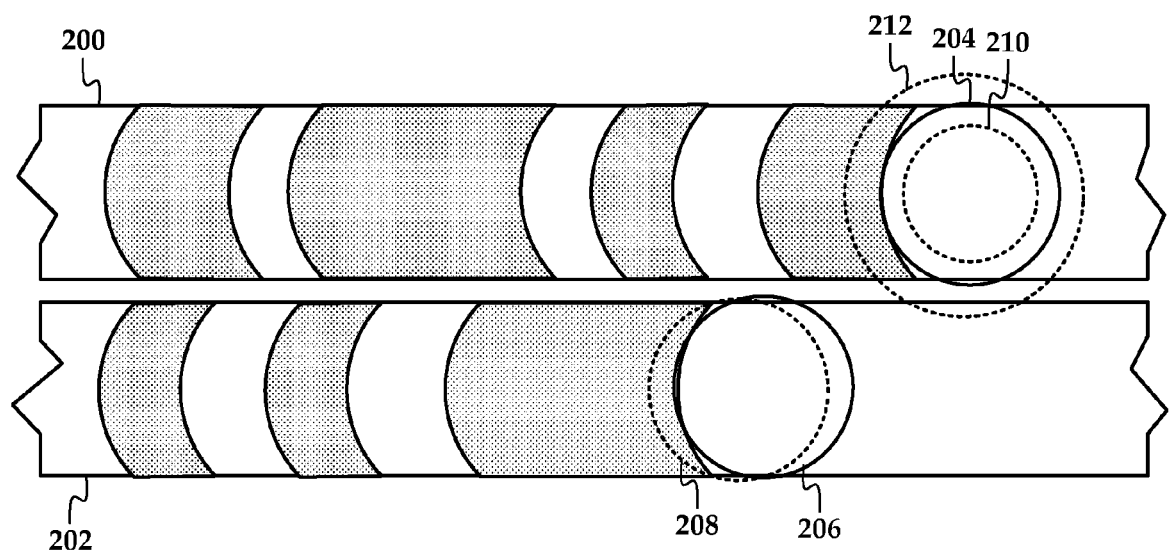
FIG. 2 is a diagram of recorded tracks according to an example embodiment.

The power monitor 114 can detect unusual variations in the optical power delivered to the recording medium. For example, a significant increase or decrease in power can affect the reliability of the written data. An example of this is shown in the diagram of FIG. 2, which shows two tracks 200, 202 according to an example embodiment. The different shaded areas in the tracks 200, 202 represent regions of different magnetic orientation. Circles 204, 206 represent a nominal hotspot size on the tracks 200, 202, e.g., a hotspot size that is optimal given the desired track width and linear bit density of the tracks 200, 202. When a laser's power increases rather abruptly (sometimes called a mode hop) the thermal profile of the spot size sent to the media may increase or shift, causing the written transition to occur earlier than expected. The spot size of the profile is thought to be constant in some cases. This case is represented by dashed circle 208, which indicates a momentary downtrack shift due to mode hopping relative to the nominal hotspot 206. This is one example of a downtrack effect.

Downtrack effects may also occur when the laser's power decreases or increases thereby affecting the size of the hotspot. In such a case, the written transition is written later or earlier than expected because the thermal profile of the spot size has changed. This is indicated by dashed circles 210, 212, which indicate a hotspot at respective lower and higher values than nominal 204. These variations 210, 212 can also result in crosstrack effects, such as increasing chances of encroachment when the hotspot is too big, and making the track too narrow when the hotspot is too small. In the latter case, the field strength of the bits may be too weak for reliable data storage and retrieval. Both of these crosstrack effects can lead to degradation in the form of increased bit error rate (BER) on the written track and/or neighboring tracks.

As noted above, the downtrack effects can cause a shift in the written bit transitions. Where the shift is constant over a large number of bits (e.g., hotspot too big or too small for a long period of time), this may be observed as a shift relative to a nominal reference point, such as servo marks written on the recording medium during manufacture, or the expected bit location. This shift may be evenly applied to all transitions within the data sectors, however, and so may only be detected at the start of the data sector. For more randomly occurring events, such as laser mode hopping, the shifts may be randomly distributed within the data sectors.

During normal writing activity the power monitor's output will be analyzed. Depending on the severity of change in the power monitor's output relative to some baseline, the host could adjust a directed offline scan (DOS) process and/or the DOS counters. In general DOS is a feature which will periodically scrub a track (e.g., put the track data into a buffer and rewrite the track from the buffer to ensure the track can be later read reliably) when its neighboring tracks have been written too often. A track can degrade over time due to encroachment from neighboring tracks that are rewritten many times. The DOS counters for a specific track monitor the number of times neighboring tracks are written. For example, the DOS counters for Track Y may at least record how often tracks Track Y−1 and Track Y+1 were written and are therefore a metric of the possible degradation of Track Y. If the DOS counters for track Y exceed some threshold, the feature scrubs Track Y.

If during the writing of a track, the power monitor output increases by some relative threshold, this is indicative of an increase in power from the laser. As such, the width of the track may be larger than desired, and risk of affecting neighboring tracks increases. In such a case, the DOS counters on the two (or more) adjacent tracks either side of the written track can be increased by some value. This value could be weighted by the severity of the output from the power monitor. This will cause the tracks to be rewritten sooner than would occur under normal conditions.

If the output of the power monitor decreases by some threshold amount, this suggests laser power decreased during the write. As such, the data may not have been written reliably to the currently-written, target track. In such a case, the DOS counters on the target track can be increased because there is a chance the track was written poorly. Again, this will cause the target track to be rewritten sooner than would occur under normal conditions. In some cases, if this condition is detected, the data of the target track may be maintained in a buffer or cache such that the target track can be scrubbed without having to first read the track. For example, the storage device may be a hybrid drive with a non-volatile cache (e.g., flash memory) that allows storing the track data for later rewriting to the disk.

Some variations to this procedure may include setting the DOS counters on the neighboring tracks (or the current track, as appropriate) to a maximum value to ensure the tracks are scrubbed as soon as there is time, Where the laser power is higher than desired, the range of tracks scanned can be extended to ± X tracks away. In other variations, the DOS counters on the adjacent tracks can be incremented asymmetrically depending on drive factors (e.g. the adjacent track interference profile of the drive, an off-center write). For example, if it is determined that the increase in laser power caused the track to also be written off-center, then one adjacent track would be encroached by a greater amount than the other adjacent track. This one adjacent track could then have a high/maximum DOS counter increment, while the other track may have a lower or normal DOS counter increment.

There is also another concern on the center track when the laser power increases. As noted above, because the hotspot is larger, the magnetic transitions will be written earlier than expected relative to some nominal location, e.g., servo timing marks written to the disk. This can cause performance loss, e.g., make it difficult to synchronize to bit transitions. Therefore, the DOS counters on the center track can also be altered when the power monitor output exceeds some maximum value. This maximum value could be the same or different than that which triggers the adjacent track DOS increment. Further, the amount of DOS increment could be the same or different than that of the adjacent tracks.

As noted above, a change in optical power can affect the track profile asymmetrically, e.g., causing the track center to be offset from servo-defined track location. Therefore, one feature that may be incorporated into a storage device is to determine how off-center the track was written. This can be done by doing a cross-track scan of the track using the reader and recording amplitude at a number of servo offsets. However a cross-track scan can be time consuming. Another, quicker way of measuring centeredness of a track is to use the dibit response in the channel. Based on analysis of the dibit response one can extract how far off-center a write occurred. Depending on this, in possible combination with the severity and sign of the power monitor output's change, one can alter the DOS counters on the center track and/or adjacent tracks too.

Figure 3:
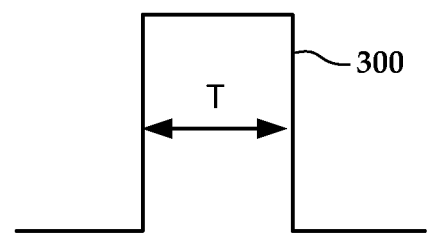
FIGS. 3 and 4 are diagrams of a dibit and dibit response used in a method and apparatus according to an example embodiment.
Figure 4:
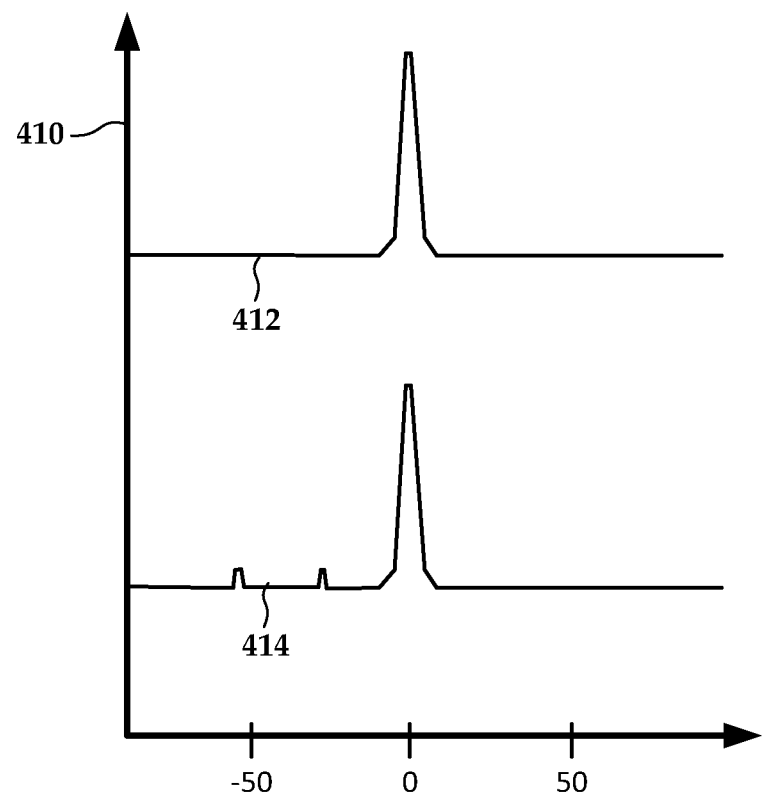

In FIGS. 3 and 4, diagrams show an example dibit and dibit response that may be used in determining a track being off-center. A dibit 300 as seen in FIG. 3 includes two transitions, which includes two transitions separated by a bit period T. Channel response to the dibit, as shown in graph 410 of FIG. 4, provides information on various distortions in the system. For example, trace 412 represents a relatively clean dibit response. Trace 414 incudes additional "side peaks" that, among other things, can indicate how off center a track was written. These side peaks can be also used to determine which direction the track was offset. This dibit data can be used to adjust the DOS counters for adjacent tracks asymmetrically.

Figure 5:
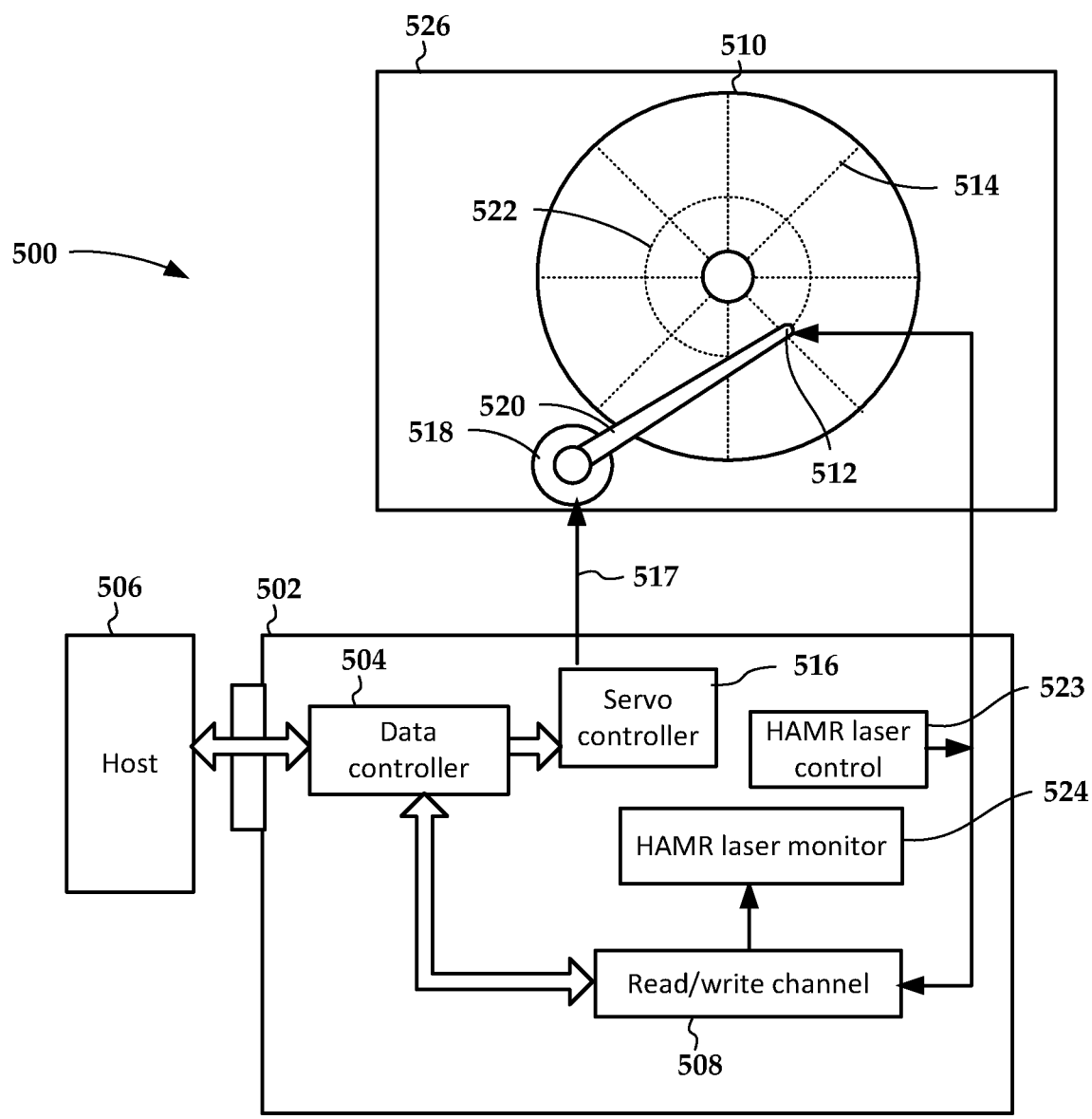
FIG. 5 is a block diagram of an apparatus according to an example embodiment.

In FIG. 5, a block diagram illustrates a data storage apparatus 500 according to an example embodiment. Control logic circuit 502 of the apparatus 500 includes a system controller 504 that processes read and write commands and associated data from a host device 506. The host device 506 may include any electronic device that can be communicatively coupled to store and retrieve data from a data storage device, e.g., a computer, peripheral card, etc. The system controller 504 is coupled to a read/write channel 508 that reads from and writes to a surface of a magnetic disk 510.

The read/write channel 508 generally converts data between the digital signals processed by the controller 504 and the analog signals conducted through one or more read/write heads 512 during read operations. To facilitate the read operations, the read/write channel 508 may include analog and digital circuitry such as preamplifiers, filters, decoders, digital-to-analog converters, timing-correction units, etc. The read/write channel 508 also provides servo data read from servo wedges 514 on the magnetic disk 510 to a servo controller 516. The servo controller 516 uses these signals to provide a voice coil motor control signal 517 to a VCM 518. The VCM 518 rotates an arm 520 upon which the read/write heads 512 are mounted in response to the voice coil motor control signal 517.

Data within the servo wedges 514 is used to detect the location of a read/write head 512 relative to the magnetic disk 510. The servo controller 516 uses servo data to move a read/write head 512 to an addressed track 522 and block on the magnetic disk 510 in response to the read/write commands (seek mode). While data is being written to and/or read from the disk 510, the servo data is also used to maintain the read/write head 512 aligned with the track 522 (track following mode).

The disk drive 500 uses HAMR, and therefore the read/write heads 512 include an energy source (e.g., laser diode) that heats the magnetic disk 510 when recording. A HAMR laser control block 523 sends a current to activate the lasers when recording. To assist in detecting and compensating for variations in the application of heat to the disk, a HAMR laser power monitor 524 examines signals from an optical power sensor on the read/write head 512. The optical power sensor may be coupled to the HAMR laser power monitor 524 via the circuitry of the read/write channel 508, or equivalents thereof. The data gathered by the HAMR laser power monitor 524 may at least include a deviation of the optical power from nominal, as well as dibit response. The HAMR laser power monitor 524 can provide triggers used by the controller 504 and/or host 506. The controller 504 and/or host 506 can use these triggers to mitigate the effects of the optical power change. For example, DOS counters can be changed as described above to initiate scrubbing of affected tracks (e.g., the currently written track and adjacent tracks).

Figure 6:
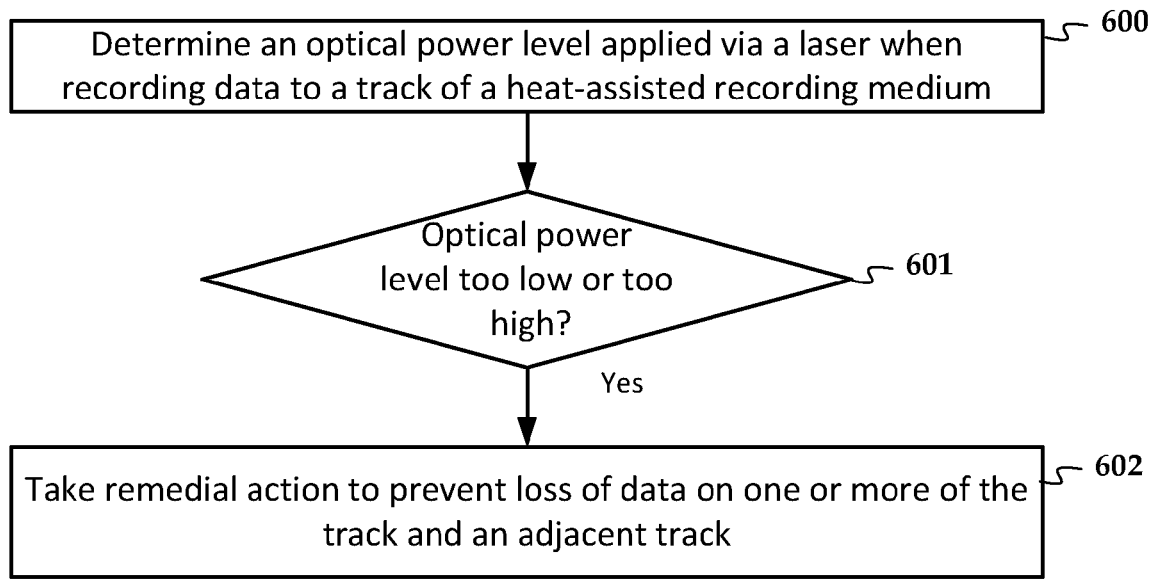
FIGS. 6-8 are flowcharts of methods according to example embodiments.

In FIG. 6, a flowchart shows a method according to an example embodiment. The method involves causing an apparatus (e.g., data storage device) to determine 600, via a power sensor, an optical power level applied via a laser when recording data to a track of a heat-assisted recording medium. In this and other embodiments, the optical power may be measured directly when recording and/or after recording. For example, a temperature reading of a sensor just after the laser has shut off may be used as a measure of the net optical power applied while recording. In response to determining 601 if optical power level is too low or too high, remedial action is taken 602 to prevent loss of data on one or more of the track and an adjacent track.

Figure 7:
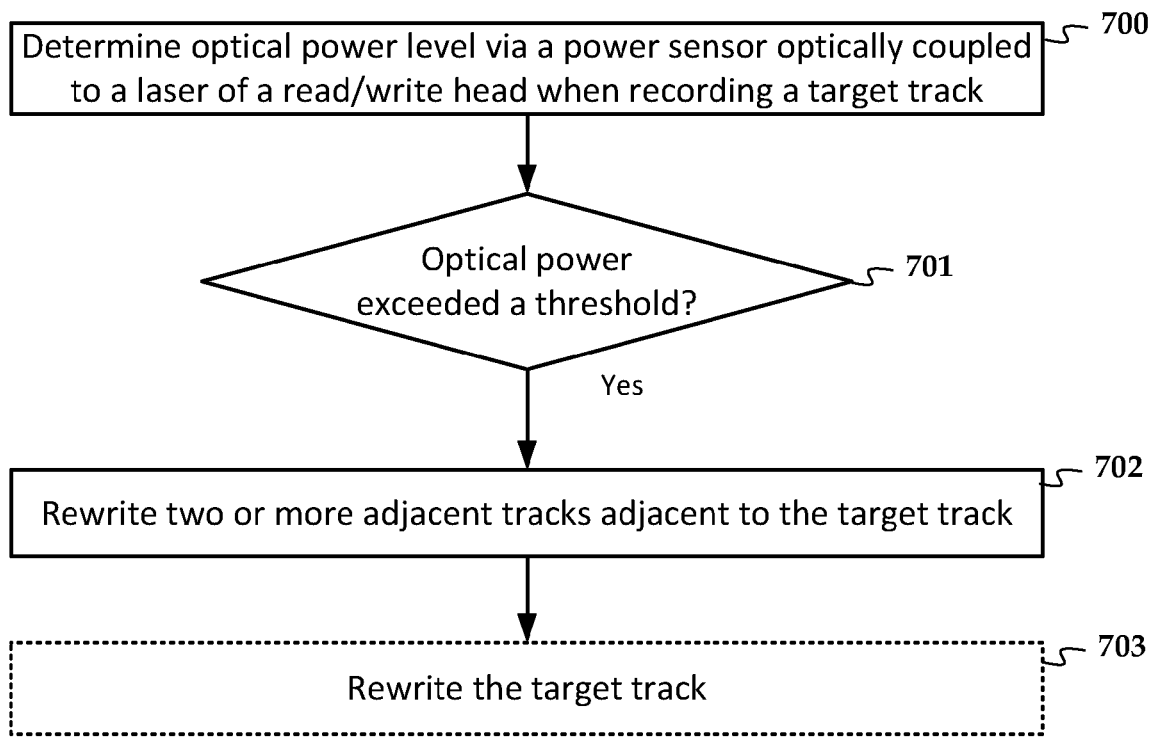

In FIG. 7, a flowchart shows a method according to another example embodiment. The method involves causing an apparatus (e.g., data storage device) to determine 700 an optical power via a power sensor optically coupled to a laser of a read/write head when recording a target track to a heat-assisted recording medium. If it is determined 701 that the optical power level exceeded a threshold, two or more adjacent tracks adjacent to the target track are rewritten 702 to prevent loss of data on the two or more adjacent tracks due to adjacent track interference. The target track may optionally be rewritten 703.

Figure 8:
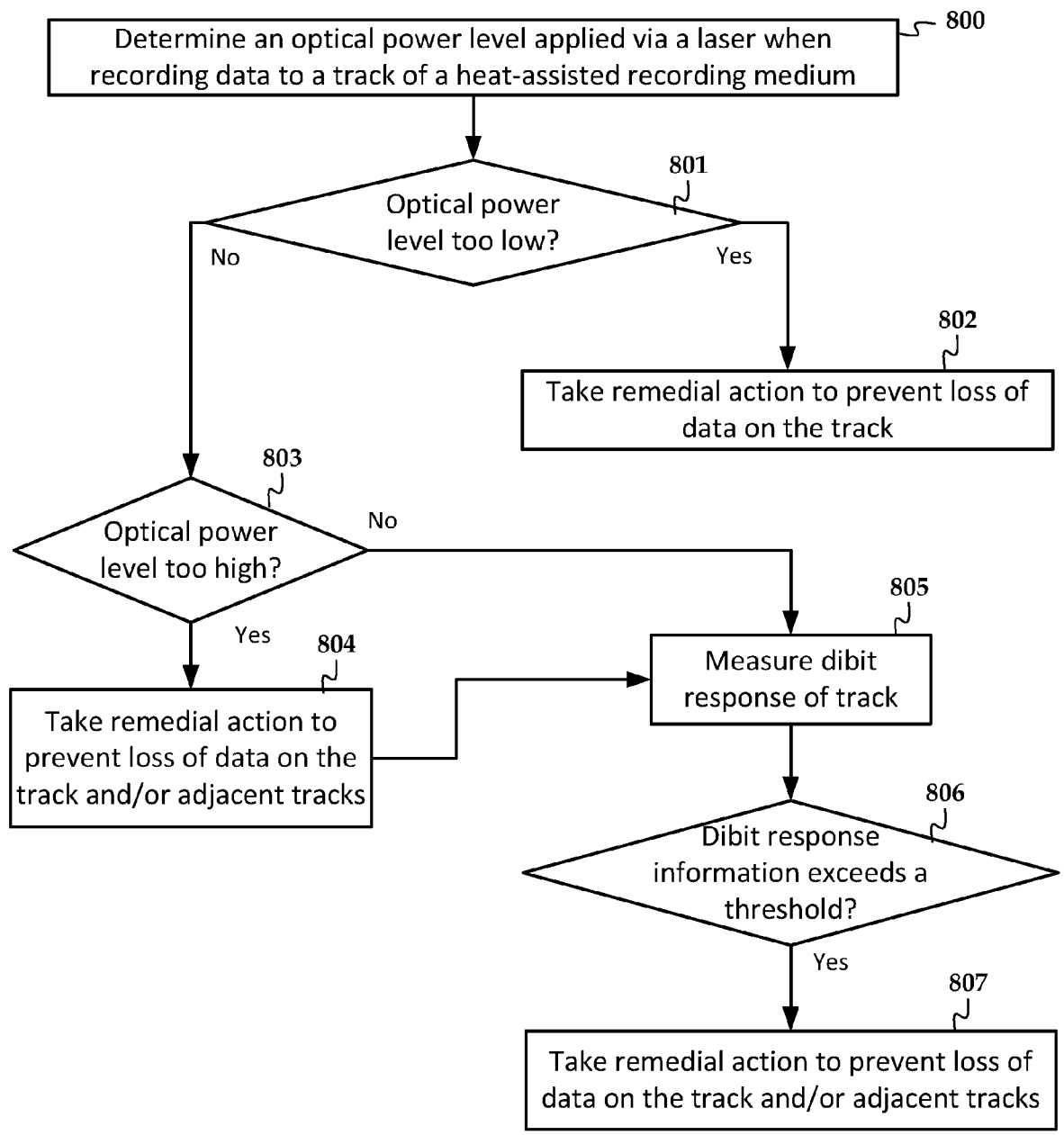

In FIG. 8, a flowchart shows a method according to another example embodiment. The method involves causing an apparatus (e.g., data storage device) to determine 800 an optical power via a power sensor optically coupled to a laser of a read/write head when recording a target track to a heat-assisted recording medium. If it is determined 801 that the optical power level is too low, remedial action is taken 802 to prevent loss of data on the track, e.g., due to the track being too narrow and/or to bit timing errors. Otherwise, it is determined 803 whether the optical power is too high. If so, remedial action is taken 802 to prevent loss of data on the track and/or adjacent tracks, e.g., due to adjacent track interference on the adjacent tracks, timing errors on the target track.

If the determination 803 that the optical power was too high, or if it was too high but no remedial action was taken on one of the target or adjacent tracks, a dibit response is measured 805. If it is determined 806 that the dibit response information exceeds a threshold, then remedial action may be taken on the target track and/or adjacent tracks. For example, even if written at the correct power, an offset track may be difficult to read back due to the servo system positioning the read head off of track center, which results in higher BER.

It will be understood that the method shown in FIG. 8 may be varied in a number of ways. For example, both optical power level and dibit response shown measured at blocks 800 and 805 could be measured and/or tested before deciding on remedial action. In such a case, a combined metric of power level delta and dibit response information can be used to determine remedial response thresholds as well as the type of remedial action taken. Because measuring 805 of dibit response involves re-reading the written track, the dibit response measurement 805 in such a scenario may only occur if one of decision blocks 801, 803 returns "yes."

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method comprising:
   determining high and low power levels applied via a laser used to record data to a heat-assisted recording medium using the laser, the high power level resulting in interference with an adjacent track and the low power level resulting in reduced reliability of the data recorded to the track;
   determining, via a power sensor, an optical power level applied via the laser when recording a track to the heat-assisted recording medium; and
   in response to the optical power level being at or below the low power level or at or above the high power level, taking remedial action to prevent loss of data on one or more of the track and the adjacent track, wherein the remedial action comprises one of:
      adjusting a first counter of adjacent track writes associated with the adjacent track, the adjacent track being rewritten when the first counter exceeds a first threshold; and
      adjusting a second counter of adjacent track writes associated with the track, the track being rewritten when the second counter exceeds a second threshold.

2. The method of claim 1, wherein the power sensor comprises a photodetector.

3. The method of claim 1, wherein the power sensor comprises a bolometer.

4. The method of claim 1, wherein the remedial action includes adjusting the first counter of adjacent track writes the adjusting of the first counter causing the adjacent track to be rewritten sooner than would occur if the optical power was between the low power level and the high power level when recording the track.

5. The method of claim 4, wherein the remedial action includes adjusting the second counter of adjacent track writes, the adjusting of the second counter causing the track to be rewritten sooner than would occur if the optical power was between the low power level and the high power level when recording the track.

6. The method of claim 1, wherein the remedial action includes adjusting the second counter of adjacent track writes, the adjusting of the counter causing the track to be rewritten sooner than would occur if the optical power was between the low power level and the high power level when recording the track.

7. The method of claim 1, wherein the optical power level is at or above the high power level or at or below the low power level due to mode-hopping of the laser.

8. The method of claim 1, further comprising determining that side peaks of a dibit response of the track have exceeded a threshold, indicating the track is written off-center and a direction thereof, and wherein the remedial action is taken further in response to the side peaks of the dibit response exceeding the threshold.

9. An apparatus comprising:
   circuitry configured to read a signal from a power sensor that detects an optical power level applied via a laser when recording data to a track of a heat-assisted recording medium;
   and a controller coupled to the circuitry and configured to:
      determine a high power level that when applied to the laser during recording, results in interference with an adjacent track;
      determine a low power level that, when applied to the laser during recording, results in reduced reliability of the data;
      determine, via the power sensor, that the optical power when recording data to the track is at or below the low power level or at or above the high power level; and
      in response to the optical power level being at or below the low power level or at or above the high power level, take remedial action to prevent loss of data on one of the track or an adjacent track, wherein the remedial action comprises one of:
         adjusting a first counter of adjacent track writes associated with the adjacent track, the adjacent track being rewritten when the first counter exceeds a first threshold; and
         adjusting a second counter of adjacent track writes associated with the track, the track being rewritten when the second counter exceeds a second threshold.

10. The apparatus of claim 9, wherein the power sensor comprises one of a photodetector or a bolometer.

11. The apparatus of claim 9, wherein the remedial action includes adjusting the first counter of adjacent track writes, the adjusting of the first counter causing the adjacent track to be rewritten sooner than would occur if the optical power was between the low power level and the high power level when recording the track.

12. The apparatus of claim 11, wherein the remedial action further includes adjusting the second counter of track writes, the adjusting of the second counter causing the track to be rewritten sooner than would occur if the optical power was between the low power level and the high power level when recording the track.

13. The apparatus of claim 9, wherein the remedial action further includes adjusting the second counter of track writes, the adjusting of the first counter causing the track to be rewritten sooner than would occur if the optical power was between the low power level and the high power level when recording the track.

14. The apparatus of claim 9, wherein the optical power level is at or above the high power level or at or below the low power level due to mode-hopping of the laser.

15. The apparatus of claim 9, wherein the controller is further configured to determine that side peaks of a dibit response of the track have exceeded a threshold, indicating the track is written off-center and a direction thereof, and wherein the remedial action is taken further in response to the side peaks of the dibit response exceeding the threshold.

16. A method comprising:
   determine, via a power sensor optically coupled to a laser of a read/write head, that an optical power level has exceeded a first threshold by a power level delta when recording a target track to a heat-assisted recording medium;
   determining that side peaks of a dibit response of the target track have exceeded a second threshold, indicating the target track is written off-center and a direction thereof;
   determining a combined metric comprising the power level delta and the side peaks of the dibit response: and
   in response to the combined metric exceeding a remedial response threshold, rewrite one or more adjacent tracks adjacent to the target track to prevent loss of data on the one or more adjacent tracks due to adjacent track interference.

17. The method of claim 16, wherein rewriting the one or more adjacent track includes adjusting respective counters of adjacent track writes associated with the one or more adjacent tracks, the one or more adjacent tracks being rewritten when the counters exceed a threshold, the adjusting of the counters causing the one or more adjacent tracks to be rewritten sooner than would occur than if the combined metric was below the remedial response threshold when recording the target track.

18. The method of claim 17, further comprising adjusting a second counter of adjacent track writes associated with the target track, the target track being rewritten when the second counter exceeds a threshold, the adjusting of the second counter causing the target track to be rewritten sooner than would than if the combined metric was below the remedial response threshold when recording the target track.

19. The method of claim 17, wherein the one or more adjacent tracks comprise two or more adjacent tracks on either side of the target track, the counters being adjusted by different amounts to account for the direction that the target track is off-center.

* * * * *